US006798431B2

(12) United States Patent
Frodl et al.

(10) Patent No.: US 6,798,431 B2
(45) Date of Patent: Sep. 28, 2004

(54) ARRANGEMENT FOR SETTING THE SPEED OF AN INTERMEDIATE CARRIER IN AN ELECTROPHOTOGRAPHIC PRINTER DEVICE

(75) Inventors: Herbert Frodl, Poing (DE); Christian Kuermeier, Erding (DE)

(73) Assignee: Océ Printing Systems GmbH, Poing (DE)

( * ) Notice: Subject to any disclaimer, the term of this patent is extended or adjusted under 35 U.S.C. 154(b) by 118 days.

(21) Appl. No.: 10/232,191

(22) Filed: Aug. 30, 2002

(65) Prior Publication Data

US 2003/0048313 A1 Mar. 13, 2003

(30) Foreign Application Priority Data

Aug. 30, 2001 (DE) ........................................ 101 42 326

(51) Int. Cl.[7] ......................... B41J 2/385; G01D 15/06; G03G 15/01

(52) U.S. Cl. .......................... 347/116; 347/19; 347/139

(58) Field of Search ................................ 347/116, 139, 347/19, 101; 399/38, 301

(56) References Cited

U.S. PATENT DOCUMENTS

| | | | | |
|---|---|---|---|---|
| 4,774,524 A | | 9/1988 | Warbus et al. | 346/44 |
| 5,093,674 A | * | 3/1992 | Storlie | 347/116 |
| 6,269,237 B1 | | 7/2001 | Olbrich et al. | 399/401 |

FOREIGN PATENT DOCUMENTS

| | | | |
|---|---|---|---|
| EP | 0 469 282 | 2/1992 | G03G/15/01 |

* cited by examiner

*Primary Examiner*—Hai Pham
*Assistant Examiner*—Lam S Nguyen
(74) *Attorney, Agent, or Firm*—Schiff Hardin LLP

(57) ABSTRACT

In a printer system composed of a plurality of printer devices, the speed of the recording medium to be printed and of the intermediate carrier in every printer device following a printer device is adapted to the changing dimensions of the recording medium. For example, the changes in the recording medium that occur due to the fixing of toner images on the recording medium and that lead to a degradation of the print image are considered in following printer devices.

13 Claims, 2 Drawing Sheets

TAB-AT

| Operating Mode | V1 | V2 |
|---|---|---|
| DR1 | V1(t1,n) | V2(t1,n) |
| DR2 | V1(t2,real) | V2(t2,real) |

TAB-ZF

| Operating Mode | V1 | V2 |
|---|---|---|
| DR1 | V1(z1,n) | V2(z1,n) |
| DR2 | V1(z2,real) | V2(z2,real) |

TAB-AT

| Operating Mode | V1 | V2 |
|---|---|---|
| DR1 | V1(t1,n) | V2(t1,n) |
| DR2 | V1(t2,real) | V2(t2,real) |

TAB-ZF

| Operating Mode | V1 | V2 |
|---|---|---|
| DR1 | V1(z1,n) | V2(z1,n) |
| DR2 | V1(z2,n) | V2(z2,n) |

$$v(z,real) = v(z,n) * \frac{v(t,real)}{v(t,n)}$$

ARRANGEMENT FOR SETTING THE SPEED OF AN INTERMEDIATE CARRIER IN AN ELECTROPHOTOGRAPHIC PRINTER DEVICE

BACKGROUND OF THE INVENTION

1. Field of the Invention

The invention relates to an arrangement and appertaining method for setting the speed of an intermediate carrier in an electrophotographic printer device.

2. Description of the Related Art

Electrophotographic printer devices are known (for example, U.S. Pat. No. 4,774,524). In these devices, a charge image of the image to be printed is generated on an intermediate carrier (e.g., a photoconductor drum), is transfer-printed onto a recording medium (e.g., paper), and is subsequently fixed on the recording medium.

There are digital electrophotographic printer devices that can process continuous stock with a transport perforation as a recording medium. There are also electrophotographic printer devices that can process recording media without a transport perforation (pinless) with a suitable transport device. Given printing systems with a plurality of successively coupled printer devices (for example, a twin system with two printer devices, or a triple system with three printer devices), the recording medium to be printed may problematically shrink in the longitudinal direction in the first printer device or following printer devices when using thermal fixing. In order to compensate this length change in every following printer device, the transport device for the recording medium in this printer device must run slower by the amount of shrinkage.

Due to the slower running of the recording medium, a relative velocity derives between recording medium and intermediate carrier since the speed of the intermediate carrier in printer device 2 or 3 is not reduced. The print image present on the intermediate carrier and composed of correspondingly arranged toner material can then be smeared at certain locations in the transfer printing event between intermediate carrier and recording medium due to the relative velocity. This appears as disturbing transverse streaking and in raster area of the print images on the recording medium that appear restless.

SUMMARY OF THE INVENTION

The invention provides an arrangement for setting the speed of an intermediate carrier that considers changes in the dimensions of the recording medium in longitudinal direction that are present before entry into the printer device.

This problem is solved by an arrangement for setting a speed of an intermediate carrier in an electrophotographic printer device which generates print images that are transfer-printed onto a recording medium moved by a transport mechanism, comprising an intermediate carrier drive configured to adapt a speed of the intermediate carrier to a feed velocity of the transport mechanism in order to compensate for changes in dimensions of the recording medium in a longitudinal direction that are present before entry into the transport mechanism.

This problem is also solved by a method for setting the speed of an intermediate carrier in an electrophotographic printer device, comprising generating print images on the intermediate carrier that are transfer-printed onto a recording medium and moved by a transport mechanism; adapting an intermediate carrier speed to a speed of the recording medium that considers changes in dimensions of the recording medium in a longitudinal direction that occurred before entry into the transport mechanism. This method may also further comprise providing a plurality of electrographic printer devices in sequence; and respectively storing in a table, for each printer device, an intermediate carrier speed (v(z, real)) with a value dependent on a position of a respective printer device in the sequence of printer devices. The invention is explained in more detail below.

The invention is very advantageous when a plurality of printer devices in a printing system print successively on a recording medium. The following description proceeds on the basis of this case. However, the invention could also be utilized in an individual printer device since irregularities in the print image are avoided in any case given a coupling of the speed of the intermediate carrier to that of the recording medium.

Up to now, intermediate carriers in all printer devices of a printing system have been driven with an identical (normal) speed regardless of whether they represent the first, second or some further printer device. As a result, there are sometimes disturbing degradations of the print image in printing systems having a plurality of printer devices. These disadvantages are now prevented by use of the inventive arrangement.

To that end, the speed of the intermediate carrier in the previously mentioned printing systems is adapted to the shrinkage of the recording medium that arises in preceding printer devices in order to achieve an improvement of the transfer printing quality and, thus, an improvement of the print quality on the recording medium. Developments of the invention are described below.

In order to adapt the speed of the intermediate carrier to the shrinkage of the recording medium, a table can be provided in the controller for the intermediate carrier drive in which the speed adapted to the shrinkage of the recording medium—also called real speed—is stored for the appertaining electrophotographic printer device. A table that contains the adapted (or real) speed for the recording medium feed can also be provided in the controller for the transport device.

The speed of the intermediate carrier can also be adapted to the modified dimensions of the recording medium in that it is coupled to the feed velocity of the recording medium. It is then advantageous when the transport device separately calculates the feed velocity of the recording medium for each electrophotographic printer device. This is possible, for example, when synchronization marks are applied on the recording medium that are respectively sensed by the transport devices of the electrophotographic printer devices, which can enable the adapted or real speed of the recording medium to be determined. The real speed of the intermediate carrier can then be calculated from the real speed of the recording medium.

Given a printing system composed of a plurality of electrophotographic printer devices, it is expedient when the first printer device applies the synchronization marks onto the recording medium.

The intermediate carrier of the electrophotographic printer devices can be photoconductor drums or photoconductor belts.

DESCRIPTION OF THE DRAWINGS

The invention is explained in greater detail on the basis of Figures.

DETAILED DESCRIPTION OF THE INVENTION

Figure 1:
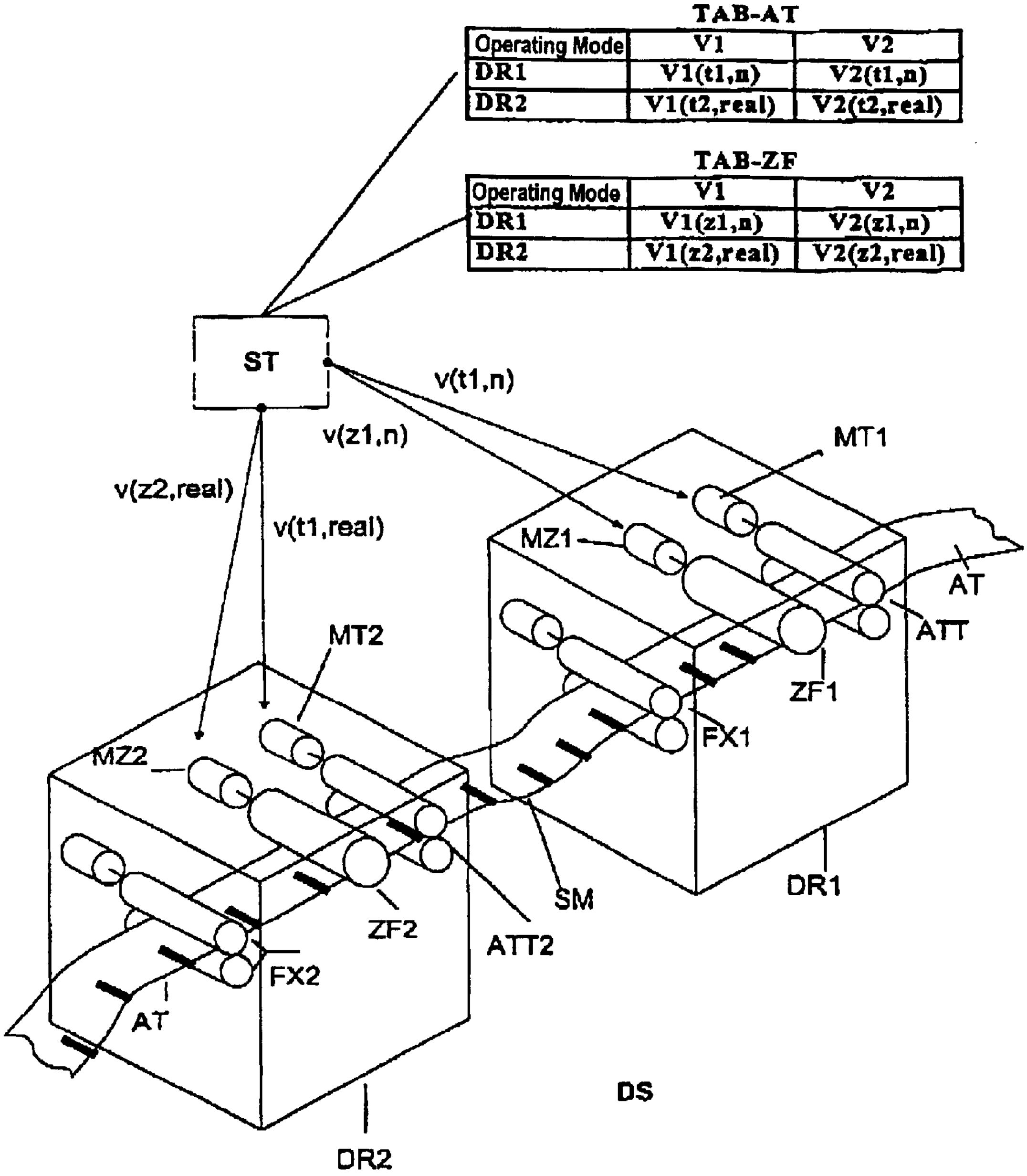
FIG. 1 is an isometric view of a first embodiment of the inventive printing system.
Figure 2:
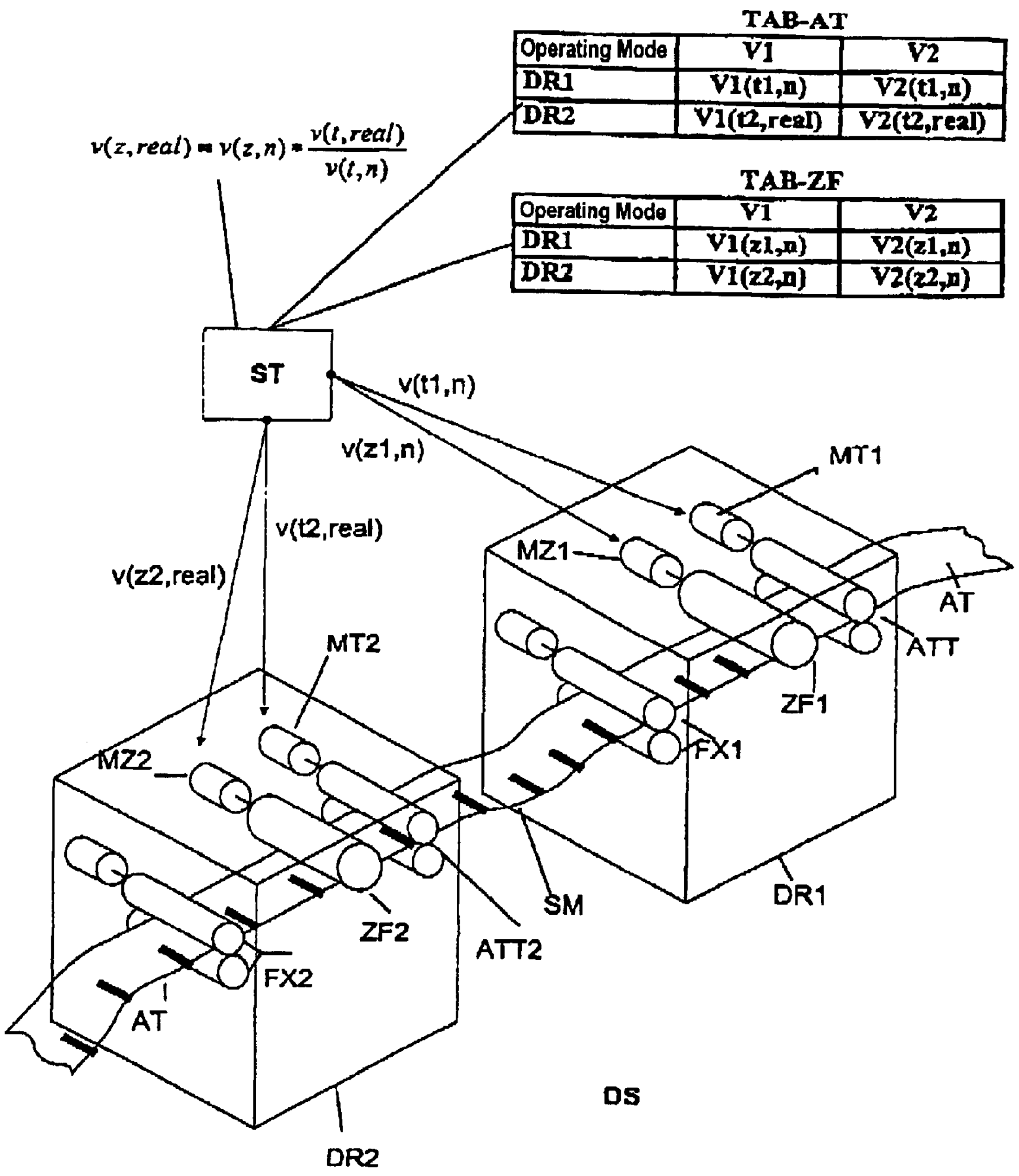
FIG. 2 is an isometric view of a second embodiment of the inventive printing system.

FIGS. 1 and 2 show exemplary printing systems DS that are composed of two electrophotographic printer devices DR1 and DR2. The invention can have more than two printer devices, however. Each electrophotographic printer device is constructed in a known way. For explaining the invention, however, it suffices to specify those function units of an electrophotographic printer device that are involved with the feed of the recording medium and the drive of the intermediate carrier.

A recording medium AT is supplied to each electrophotographic printer device DR. The recording medium AT is respectively moved into the printer device DR by a transport mechanism that, for example, is composed of a drive motor MT and transport rollers ATT. The recording medium AT proceeds to the intermediate carrier ZF (e.g., a photoconductor drum) that is driven by an intermediate carrier drive MZ. A charge image of the image to be printed is generated in a known way on the intermediate carrier ZF and is then inked with toner in a known way. Subsequently, the toner image is transfer-printed onto the recording medium AT. For uniting the print images with the recording medium AT, the latter is conducted through a fixing station FX in which, for example, a heat-fixing occurs. The fixing has the disadvantage that the dimensions of the recording medium AT are changed in longitudinal direction. A shrinkage of the recording medium occurs, particularly in the longitudinal direction.

The description of the operation of a printing system composed of two electrophotographic printer devices is described below as an example.

Electrophotographic Printer Device DR1

The speed v(t1) with which the transport mechanism MT1, ATT1 moves the recording medium AT can be set and is called the nominal speed v(t1, n). The speed v(z1) with which the intermediate carrier drive MZ1 moves the intermediate carrier ZF1 is likewise preset and is called the nominal speed v(z1, n). The values for the nominal speeds can be contained in a first table, a recording medium speed table, TAB-AT for the speed of the recording medium AT and in a second table, an intermediate carrier speed table, TAB-ZF for the speed v(z, n) of the intermediate carrier. A number of operating modes are possible for the electrophotographic printer device, i.e., the printer device can be operated with different speeds (the example shown illustrates two speeds, e.g., v1, v2 shown in the tables TAB-AT and TAB-ZF). When only the first operating mode (v1) is considered, the recording medium AT is moved with the speed v1(t1, n) and the intermediate carrier is moved with v1(zl, n), where v1(z1, n) is the nominal speed of the intermediate carrier ZF1 and v1(tl, n) is the nominal speed of the recording medium AT.

Electrophotographic Printer Device DR2

The recording medium AT is subsequently supplied to the electrophotographic printer device DR2. If the transport mechanism MT2, ATT2 and the intermediate carrier drive MZ2 were likewise to move the recording medium AT and the intermediate carrier ZF2 with the nominal speed v(t, n) and v(z, n), this would lead to the printing in the printer device DR2 no longer being faultless because of the shrinkage of the recording medium AT in the printer device DR1. This is especially true of the transfer printing of the print characters from the intermediate carrier ZF2 onto the recording medium AT. For this reason, the transport mechanism MT2, ATT2 should move the recording medium AT with a modified, real speed v(t2, real) compared to the nominal speed v(t2, n), and the intermediate carrier drive MZ2 should also move the intermediate carrier ZF2 with a modified, real speed v(z2, real) compared to the nominal speed. It is expedient to couple the speed of the intermediate carrier ZF2 to that of the recording medium AT since the feed velocity of the recording medium AT and speed of the intermediate carrier ZF2 are then adapted to one another, thus avoiding smearing in the transfer printing of the characters from the intermediate carrier ZF2 onto the recording medium AT.

Two solutions of the problem are explained below.

Solution 1

A first solution provides tables TAB in the electrophotographic printer devices following the first printer device, namely respectively for the transport mechanism MT, ATT as well as for the intermediate carrier drive MZ. The adapted values for the feed velocity v(t, real) of the recording medium AT and for the speed v(z, real) of the intermediate carrier ZF are contained in these tables TAB. For example, the nominal speeds v(t1, n) for the first printer device DR1 can be stored in line 2 in a table TAB-AT for the recording medium AT for the operating modes v1, v2 (line 1), and the real (adapted) speeds v(t2, real) for the second printer device DR2 can be stored in the next line 3. The nominal speeds v(z1, n) (line 2) of the intermediate carrier ZF1 of the first printer device DR1 can likewise be stored in a table TAB-ZF for the operating modes v1, v2 (line 1) for the intermediate carrier ZF, and the real (adapted) speeds v(z2, real) of the second printer device DR2 can be stored in line 3.

For determining the real speed values, average values for the percentage longitudinal shrinkage of the recording medium AT in the printer devices are formed dependent on their position in the printing system DS, and the real speed values are calculated from these.

Speed values for the intermediate carrier drive that are corrected by the shrinkage of the recording medium in the preceding printer devices are then permanently deposited in the table TAB-ZF. The intermediate carrier speed is increased or reduced according to the fixed correction values v(z, real) depending on the position of the printer device in the printing system DS and on the selected printer speed.

Application to FIG. 1

The printing system DS1 with two electrophotographic printer devices DR1, DR2 according to FIG. 1 thus works in the following way, for an exemplary system which employs a paper web as recording medium AT and a photoconductor drum as intermediate carrier ZF.

The recording medium transport of the first printer device DR1 is operated with the fixed (nominal) speed v(t1, n). The value for this speed is stored in the table TAB1-AT under the position of the printer device DR1. The intermediate carrier ZF1 of the first printer device DR1 is likewise operated with fixed (nominal) speed v(z1, n). This value v(z1, n) is stored in a table TAB-ZF under the position of the printer device DR1.

The recording medium AT is heated in the fixing station FX1 of the first printer device DR1 for fixing the toner, resulting in a slight shrinkage of the recording medium AT.

In order to compensate this shrinkage in the second printer device DR2, the speed v(t2, n) of the recording medium of the second printer device DR2 is reduced to v(t2, real) proceeding from v(t, n), corresponding to the value in TAB-AT.

The intermediate carrier drive MZ2 of the second printer device DR2 is driven with the speed v(z2, real) from the table TAB-ZF under the position of the printer device DR2. This value is then the value corrected by the shrinkage of the recording medium AT.

Solution 2

The speeds v(t) of the recording medium AT of the individual electrophotographic printer devices DR of the printing system DS are continuously determined during printing operations. The speed v(z) of the intermediate carrier ZF in each of the connected printer devices is coupled to the respective speed of the recording medium, the speed of the intermediate carrier is modified by the same relative or percentage amount given a change in the speed of the recording medium AT produced by shrinkage. The change occurs in the same direction, i.e., it is positively correlated—an increase in the speed of the intermediate carrier ensues given an increase in the speed of the recording medium. The determination of the speed v(z, real) of the intermediate carrier ZF2 ensues in the following way:

$$v(z, \text{real}) = v(z, n) * \frac{v(t, \text{real})}{v(t, n)}$$

Application to FIG. 2

FIG. 2 likewise shows a printing system DS with two electrophotographic printer devices DR1, DR2. The recording medium transport of the first printer device DR1 is operated with a fixed speed v(t1, n). The value for this speed is stored in the table TAB-AT. The intermediate carrier ZF1 of the first printer device DR1 is likewise operated with a fixed speed v(z1, n). This value is stored in a table TAB-ZF. The values for the various printer processing speeds (for example, v1, v2) are respectively deposited in the tables TAB-AT, TAB-ZF.

The recording medium AT is heated in the fixing station of the first printer device DR1 for fixing the toner, resulting in a slight shrinkage of the recording medium AT. In order to compensate this shrinkage in the second printer DR2, the speed v(t2, n) of the recording medium AT of the second printer device DR2 is reduced such that synchronization marks SM that are printed onto the recording medium AT at constant time intervals in the first printer device DR1 are read with identical time intervals in the second printer device DR2. The speed value v(t2, real) is derived from this.

The speed v(z2, real) of the intermediate carrier ZF2 that is to be set is calculated with the above equation using the value v(t2, real) and with the assistance of the values for v(z2, n) stored in the table TAB-ZF. The intermediate carrier ZF2 of the second printer DR2 is driven with this speed.

A lesser or greater change in the speed of the intermediate carrier ZF in the following printer device DR thus derives depending on the shrinkage of the recording medium AT.

The controller ST required for the operation of the intermediate carrier drive MZ and transport mechanism MT, ATT derives, for example, from U.S. Pat. No. 4,774,524, which is incorporated by reference into the disclosure. This patent also describes how the speed of a recording medium can be determined from synchronization marks. The invention can also be utilized in printing systems that use a recording medium with a transport perforation as described in U.S. Pat. No. 4,774,524.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

List of Reference Characters

DS printing system
DR printer device
AT recording medium
SM synchronization marks
ATT transport rollers
MT recording medium drive
ZF intermediate carrier
MZ intermediate carrier drive
FX fixing station
ST controller
v(t, n) nominal speed of AT
v(z, n) nominal speed of ZF
v(t, real) adapted speed of AT
v(z, real) adapted speed of ZF
v(t1, n) nominal speed of AT1
v(t2, n) nominal speed of AT2
v(z1, n) nominal speed of ZF1
v(z2, n) nominal speed of ZF2 v(t1, real) adapted speed of AT1
v(t2, real) adapted speed of AT2
v(z1, real) adapted speed of ZF1
v(z2, real) adapted speed of ZF2

What is claimed is:

1. An arrangement for setting a speed of an intermediate carrier in an electrophotographic printer device which generates print images that are transfer-printed onto a recording medium moved by a transport mechanism, comprising:

an intermediate carrier drive configured to adapt a speed of the intermediate carrier to a feed velocity of the transport mechanism in order to compensate for changes in dimensions of the recording medium in a longitudinal direction that are present before entry into the transport mechanism; and an intermediate carrier speed table of the intermediate carrier drive configured to store speeds adapted to dimensions of the recording medium for at least one operating mode of the printer device.

2. The arrangement according to claim 1, further comprising:

an intermediate carrier speed table of the intermediate carrier drive configured to store speeds adapted to dimensions of the recording medium for all operating modes of the printer device.

3. The arrangement according to claim 1, wherein:

the intermediate carrier drive is configured to calculate an adapted intermediate carrier speed (v(z, real)) according to an equation $$v(z, \text{real}) = v(z, n) * \frac{v(t, \text{real})}{v(t, n)}$$

wherein:

v(z, n)=intermediate carrier speed without taking changes in the dimensions of the recording medium into consideration=nominal intermediate carrier speed;

v(t, real)=adapted transport speed of the recording medium adapted to the changed dimensions of the recording medium; and v(t, n)=transport speed of the recording medium without adaptation=nominal transport speed.

4. The arrangement according to claim 3, wherein:

the transport mechanism of the recording medium determines the adapted transport speed (v(t, real) from synchronization marks applied on the recording medium.

5. The arrangement according to claim 4, wherein the electrographic printer device is defined as a first electrographic printer device, the arrangement further comprising:

a second electrophotographic printer devices, comprising a transport mechanism;

wherein the transport mechanism of the second electrophotographic printer device following the first electrophotographic printer device is configured to sense a synchronization mark applied on the recording medium by the first electrophotographic printer device and to calculate a first adapted speed (v(t, real)) with which the transport mechanism moves the recording medium from a sequence of synchronization marks; and the intermediate carrier drive of the second printer electrographic printer device is configured to calculate a second adapted speed (v(z, real)) of the intermediate carrier from the first adapted speed (v(t, real)) of the recording medium.

6. A method of operating the arrangement according to claim 2, comprising:

providing a plurality of electrographic printer devices in sequence;

successively printing a recording medium with the plurality of electrographic printer devices; and storing an adapted intermediate carrier speed dependent on a position of one of the plurality of electrographic printer devices in the sequence, the stored speed being stored in a table of an intermediate carrier drive of a respective electrographic printer device.

7. A method of operating the arrangement according to claim 4, comprising:

providing a plurality of electrographic printer devices in sequence;

successively printing a recording medium with the plurality of electrographic printer devices;

applying synchronization marks on the recording medium;

determining, in a transport mechanism of each electrographic printer device following a printer device, an adapted transport speed (v(t, real)) from the synchronization marks; and calculating an adapted intermediate carrier speed (v(z, real)) according to the equation $$v(z, \text{real}) = v(z, n) * \frac{v(t, \text{real})}{v(t, n)}$$

wherein v(z, n)=intermediate carrier speed without taking changes in dimensions of the recording medium into consideration=nominal intermediate carrier speed;

v(t, real)=adapted transport speed of the recording medium adapted to changed dimensions of the recording medium; and v(t, n)=transport speed of the recording medium without adaptation=nominal transport speed.

8. A method for setting the speed of an intermediate carrier in an electrophotographic printer device, comprising:

generating print images on the intermediate carrier that are transfer-printed onto a recording medium and moved by a transport mechanism;

adapting an intermediate carrier speed to a speed of the recording medium that considers changes in dimensions of the recording medium in a longitudinal direction that occurred before entry into the transport mechanism; and storing, in a table, the intermediate carrier speed with for at least one operating mode of the printer device.

9. The method according to claim 8, further comprising:

providing a plurality of electrographic printer devices in sequence; and respectively storing in a table, for each printer device, an intermediate carrier speed (v(z, real)) with a value dependent on a position of a respective printer device in the sequence of printer devices.

10. The method according to claim 8, further comprising:

providing a plurality of electrographic printer devices comprising a first electrographic printer device;

moving, by the first printer device printing the recording medium, the recording medium with a prescribed first nominal speed within its transport mechanism;

moving, by the first printer device, the intermediate carrier with a prescribed second nominal speed with its intermediate carrier drive;

moving, by an other printer device printing the recording medium, the recording medium with its transport mechanism with a first adapted speed (v(t, real)) that is modified compared to the first nominal speed (v(t, n)) and is dependent on a change in dimensions of the recording medium caused by the first printer devices; and driving, by the other printer device, its intermediate carrier with its intermediate carrier drive with a second adapted speed (v(z, real)) dependent on the first adapted speed (v(t, real)) of its transport mechanism.

11. The method according to claim 10, further comprising:

providing a table for the intermediate carrier drive of each electrophotographic printer device; and deriving the prescribed second nominal speed (v(z, n)) and the second adapted speed (v(z, real)) from the table.

12. The method according to claim 10, further comprising:

applying a synchronization mark in a sequence of synchronization marks on the recording medium by the first electrophotographic printer;

sensing, by a transport mechanism of a following electrophotographic printer device following the first electrophotographic printer device, the synchronization mark;

calculating, by the transport mechanism of the following electrographic printer device, a first adapted speed (v(t, real)) with which it moves the recording medium from the sequence of synchronization marks; and calculating, by the intermediate carrier drive, the second adapted speed (v(z, real)) of the from the first adapted speed (v(t, real)).

13. The method according to claim 12, further comprising:

calculating the second adapted speed (v(z, real)) according to the equation $$v(z, \text{real}) = v(z, n) * \frac{v(t, \text{real})}{v(t, n)}$$

wherein v(z, n)=nominal speed of the intermediate carrier;

v(t, n)=nominal speed of the recording medium; and v(t, real)=adapted speed of the recording medium.

* * * * *